United States Patent [19]
Asizawa et al.

[11] 3,735,792
[45] May 29, 1973

[54] SPRAY DRYING METHOD AND APPARATUS FOR PRODUCING GRANULAR PARTICLES FROM STOCK LIQUIDS OF SOLIDS

[75] Inventors: Naohito Asizawa, Sugihami-ku, Tokyo; Motomi Kono, Edogawa-ku, Tokyo, both of Japan

[73] Assignee: Asizawa Tekko Kabushiki Kaisha, Tokyo, Japan

[22] Filed: Mar. 4, 1971

[21] Appl. No.: 120,922

[30] Foreign Application Priority Data

June 1, 1970 Japan..................................45/47026

[52] U.S. Cl............159/4 CC, 159/48 R, 159/DIG. 3
[51] Int. Cl..........................B01d 1/16, F26b 3/12
[58] Field of Search...................159/4, 4 CC, 4 E, 159/48 R, DIG. 3; 34/10, 57 E

[56] References Cited

UNITED STATES PATENTS

| | | | |
|---|---|---|---|
| 1,829,477 | 10/1931 | Douthitt | 159/4 |
| 2,357,648 | 9/1944 | Hall | 159/48 R X |
| 2,561,394 | 7/1951 | Marshall | 159/48 R X |
| 3,036,338 | 5/1962 | Nack | 117/100 X |
| 3,415,665 | 12/1968 | Hussmann | 159/4 CC X |
| 2,054,441 | 9/1936 | Peebles | 159/4 E |
| 2,184,314 | 12/1939 | Peebles | 127/46 |
| 2,316,207 | 4/1943 | Winter | 34/57 E X |
| 2,635,684 | 4/1953 | Joscelyne | 159/48 R |
| 3,233,413 | 1/1966 | Berquin | 159/48 R X |
| 3,309,262 | 3/1967 | Copeland et al. | 162/30 |
| 3,376,124 | 4/1968 | Hollingsworth | 71/39 |

Primary Examiner—Norman Yudkoff
Assistant Examiner—J. Sofer
Attorney—Fleit, Gipple & Jacobson

[57] ABSTRACT

A spray drying method comprising forming a layer of solid particles at the bottom of a drying chamber defined by a vertical cylinder, blowing gas into said layer from the underside to agitate the whole of said layer and thereby to form a fluidized bed of solid particles with part of said particles being blown up from the upper surface of said fluidized bed and suspended within said drying chamber, blowing gas into said drying chamber in a direction to form a swirling downward gas flow along the side wall and a swirling upward flow along the center of said drying chamber, whereby said suspending particles are caused to make a circulatory motion while being entrained in said swirling gas flows in such a manner that the fine particles spirally move upward in the center of the drying chamber and at least the major part thereof approach the side wall of the drying chamber under the effect of centrifugal force before they reach the top of said drying chamber and finally spirally move downward along the side wall of said chamber, said particles being partially returned to said fluidized bed and partially being carried upward again in the center of the drying chamber by being entrained in said swirling upward gas flow, spraying stock solution into said drying chamber, the droplets of said sprayed stock solution colliding against and adhered to said circulating particles to form larger sized particles, said larger sized particles being dried by the surrounding gas and partially circulated within said drying chamber and partially falling into said fluidized bed, and discharging said larger sized particles from said fluidized bed while maintaining the depth of said fluidized bed substantially constant.

8 Claims, 1 Drawing Figure

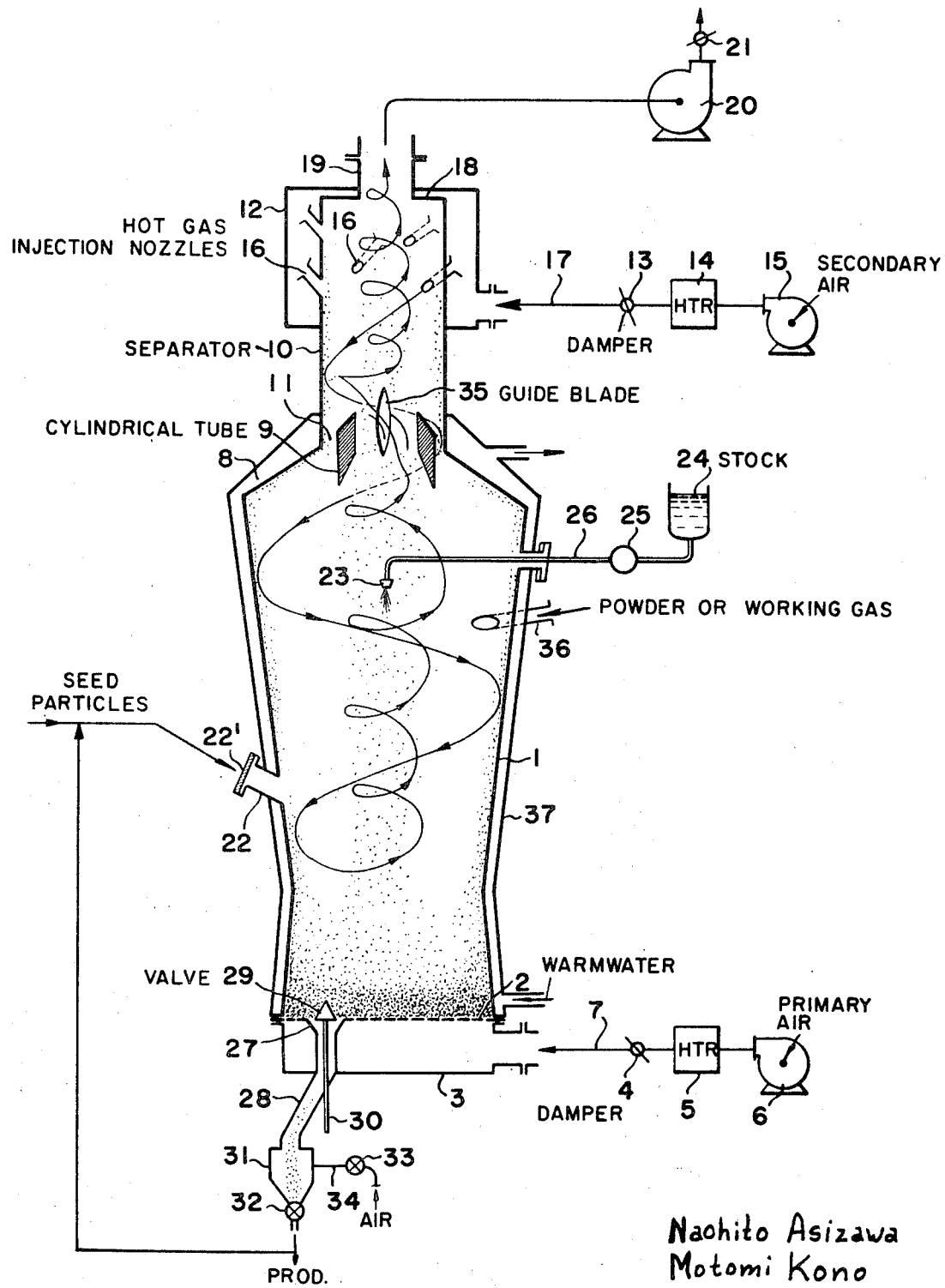

SPRAY DRYING METHOD AND APPARATUS FOR PRODUCING GRANULAR PARTICLES FROM STOCK LIQUIDS OF SOLIDS

The present invention relates to a spray drying method and apparatus for producing granular particles from stock liquids of solids in the form of solution or suspension. More specifically, the invention relates to a spray drying method and apparatus for producing granular particles from stock liquids at high yields, using a drying cylinder of circular, elliptic or polygonal shape in transverse cross section (hereinafter referred to simply as a cylinder) having particle fluidizing means and particle discharge means provided at the bottom and a gas inlet port for injecting a gas, such as hot air, into the cylinder to form a swirling downward gas flow therein and a gas outlet port at the top end thereof, by injecting air into the cylinder from the bottom thereof through a perforated plate to form a fluidized particle bed of a predetermined height at the bottom of said cylinder, while injecting a gas, such as hot air, into said cylinder from the upper portion thereof through said gas inlet port so as to form a swirling downward gas flow along the peripheral wall of said cylinder and a swirling upward gas flow in the center of said cylinder above said fluidized particle bed thereby to circulatorily suspend particles within said cylinder, spraying stock liquid of a solid of the same material as said particles (hereinafter referred to as a stock solution) in said cylinder and drying the same therein.

In forming powdery particles from stock solutions, a so-called spray drying method has widely been used, in which stock solution is sprayed in a large-sized hot air chamber through nozzle or centrifugal spray disc means and the resultant droplets of the solution are dried by hot air. Where the spray drying method cannot be employed due to the properties of stock solutions to be processed, there has been employed a method in which crystals are formed in a stock solution by the crystallization method and said crystals are separated from the stock solution and dried to obtain crystalline particles, or a method in which a liquid is concentrated by heating, followed by cooling and solidification to obtain a solid and said solid is pulverized into powdery particles. The spray dryig method is advantageous in that, since a liquid is sprayed directly into hot air, the droplets of the liquid can be dried in a short period of time (about 5 – 20 seconds). However, liquids which can be sufficiently dried in such a short period of time to enable stable powdery particles, are limited.

What is most important in obtaining a powder by the spray drying method is to prevent insufficiently dried, highly adhesive particles of liquid from attaching to the peripheral wall surface of a drying chamber. When the undried particles are brought into direct contact with the wall surface of the drying chamber, they are usually readily bonded to the wall surface, whereby the yield of the product particles is markedly lowered. Furthermore, the accumulation of the particles on the wall surface occasionally necessitates interruption of the operation, making a continuous operation impossible. It is, therefore, essential that the droplets are completely dried before they reach the wall surface, and to this end, the drying chamber is naturally required to be extremely large in size. This is one of the disadvantage of the spray drying method. For the same reason as set forth above, it is economically impossible to reduce the water content of the particles or to completely dry the same only by spray drying, and it is a common knowledge that the drying of particles is effected in the "constant-rate drying period" which is a terminology specifically used in the art. Therefore, secondary drying becomes necessary for such materials which are required to be dried to a low water content, and a rotary drier, a fluidized bed drier, etc. have been used for this purpose.

Furthermore, since the drying is required to be accomplished in a short period of time, a large quantity of air and heat are required and the heat consumption is quite large, adding to the construction cost as well as the operational cost. With reference to the particle size, it is extremely difficult to obtain large sized particles, by reason of the necessity of accomplishing the drying in a short period of time, and the particle size of even an easy-drying particle is limited to about 50 mesh at largest, it being usual that the size of the product particles is from 100 to 200 mesh. Additionally, since the particles obtained by the spray drying method are hollow spherical particles, they are not only vulnerable but also small in apparent specific gravity and hence bulky, which is disadvantageous in packaging and transportation.

A further disadvantage of the prior art spray drying method is that in molding a ceramic powder produced by the method, a large sized pressing die is required.

It is also to be noted that there are many materials, such as a sugar stock solution, which cannot in any manner be transformed into solid powders by the piror art spray drying method.

As stated above, the prior art spray drying method has a number of disadvantages. The present inventor conducted a lengthy study and experiment with a view to obviating the above-described disadvantages of the prior art spray drying method and finally has achieved the present invention.

The object of the invention, therefore, is to reduce the size, and hence the construction and operation costs of the conventional spray drying apparatus; to make a continuous stable operation possible by readily drying a stock solution to a degree of dryness which could not be attained by the conventional method, while preventing scattering of the fine powdery particles to the outside of the apparatus and attachment and growth of the undried droplets of the solution to the wall of a drying cylinder, and to obtain porous granular particles of uniform size and large apparent specific gravity which could not be attained by the conventional method; and to make it possible to process stock solutions, such as a sugar stock solution, which could hardly be transformed into powder heretofore, and thereby to obtain quality granular products.

The object of the invention set forth above can be attained by blowing a gas, e.g. hot air, into a cylinder from the bottom thereof to form a fluidized bed of particles in a predetermined height, blowing a gas, e.g. hot air, into the cylinder through a gas inlet port provided at the upper portion of said cylinder so as to form a swirling downward gas flow along the wall of said cylinder which induces a swirling upward gas flow in the center of the cylinder, causing the particles suspended in the cylinder to make a circulatory motion in which said particles are moved upward in the central portion of the cylinder while being entrained by said swirling upward gas flow, moved radially in the upper portion of the cylinder under the centrifugal force imparted thereto by the swirling gas flow and separated from said upward gas flow and finally moved downward while swirling in the cylinder by being entrained in said swirling downward gas flow, exhausting the used air to the outside of the cylinder through an exhaust port provided at the top end of said cylinder, spraying a stock solution in the cylinder in which the particles are circulated in the manner described, whereby the fine droplets of the solution impinge against and encrust said circulating fine particles forming particles of increased mass which partially make a circulatory motion while being dried by the surrounding hot air and partially fall into said fluidized particle bed at the bottom of the cylinder, while on the other hand the undried droplets of the solution falling into the fluidized particle bed are mixed and bonded to the fluidized particles to increase the size of said particles and the undried droplets of the solution attaching the wall of the cylinder are detached therefrom by being scraped by the downwardly swirling particles along the cylinder wall in frictional engagement therewith and are bonded to said particles, the resultant particles being spirally carried downward and part thereof being circulated in the cylinder to be dried, whereby larger-sized particles are continuously produced in the cylinder and dried by the gas blown into the cylinder from the underside and the swirling downward gas flow; and discharging the particles thus formed from said fluidized particle bed while maintaining the height of said fluidized particle bed within a predetermined range.

According to the present invention, it is possible to process a stock solution in a spray drying apparatus which is substantially smaller and inexpensive than the conventional one, and with less heat; to obtain a granular product which is large in particle size and bulk specific gravity and is excellent in flowability, solubility and dispersibility; and to eliminate a classifier, a screening device, a secondary drier and conveyors associated with said devices, which have been necessary heretofore. Further, the granular products obtained according to the instant invention are free of contaminates. Therefore, the present invention is of great contribution to the production of ceramic powders for electronic equipment which are required to be highly precise in composition, as well as to the production of highly pure materials for chemicals, medicines and powdery foods. In addition, the invention has such a remarkable advantage that granular particles can be obtained even from such stock solutions which could not be transformed into powder by the conventional spray drying method. Namely, one of the characteristic features of the invention resides in the fact that granular particles are obtained from stock solutions by the combined steps of forming a fluidized particle bed at the bottom of a cylinder by charging a powder into the cylinder and blowing hot gas into said cylinder from the bottom thereof, forming a circulating flow of suspended particles in the cylinder by blowing hot gas into said cylinder in a manner to form a swirling gas flow and continuously spraying a stock solution in said swirling flow within the cylinder, whereby the particles in the cylinder are bonded with the droplets of the stock solution and increased in size, and the resultant larger-sized particles fall into said fluidized particle bed, and by discharging the larger-sized particles continuously from said fluidized particle bed while maintaining the height of the fluidized bed constant. Another characteristic feature of the invention resides in the fact that a gas is blow into the cylinder from a product discharge port provided at the bottom of the fluidized particle bed, whereby the particles grown to a predetermined size are selectively obtained. It should also be noted that according to the invention, the attachment of the stock solution to the wall of the cylinder can be prevented and the thermal efficiency can be enhanced by heating the cylinder externally.

The method and apparatus of the instant invention will be described by way of example hereunder, with reference to the accompanying drawing:

The drawing is a vertical cross-sectional view of an embodiment of the apparatus according to the present invention.

In the drawing, reference numeral 1 designates a vertical drying cylinder (hereinafter referred to simply as a cylinder) having a circular horizontal cross-sectional shape, 2 a perforated plate disposed at the bottom of said cylinder 1, 3 an air chamber formed beneath said perforated plate 2, 4 a regulating damper provided in an air duct 7 to regulate the flow rate of air supplied into said air chamber 3, 5 a heater, 6 a blower, 8 a frusto-conical cover connected with the upper end of said cylinder 1 and having an opening centrally thereof, 9 a cylindrical tube disposed in the opening of said frusto-conical cover 8, and 10 a particle separating cylinder (hereinafter referred to simply as a separation cylinder) extending upwardly from the opening of said frusto-conical cover 8. The tube 9 and the separating cylinder 10 are arranged in concentrical relation to the cylinder 1. Further, the tube 9 is secured to the separating cylinder 10 by suitable means not shown. Between the tube 9 and the separating cylinder 10 is formed an annular passage 11 through which said separating cylinder 10 is communicated with the cylinder 1. Reference numeral 16 designates a plurality of secondary hot gas injection nozzle (hereinafter referred to simply as nozzles) extending tangentially downwarldly through the wall of the separating cylinder 10, with one end thereof opening into said separating cylinder and the other end into an annular secondary air chamber 12. Reference numeral 13 designates a damper provided in an air duct 17 leading into the secondary air chamber 12, 14 a heater and 15 a blower. Reference numeral 18 designates a ceiling of a separation chamber defined by the separating cylinder 10, 19 a cleaning gas outlet port, 20 an exhaust blower, 21 a damper provided in an exhaust duct, 22 a seed particle inlet port provided in the peripheral wall of the cylinder 1, 22' a closure lid for the seed particle inlet port, 23 a stock solution spray nozzle (hereinafter referred to simply as a spray nozzle), 24 a stock solution tank, 25 a pump and 26 a stock solution supply conduit. Reference numeral 27 designates a conically-shaped product discharge port (hereinafter referred to simply as a discharge port), 28 a product discharge conduit (hereinafter referred to simply as a discharge conduit) and 29 a conical valve concentrially disposed in the discharge port and operated vertically by a valve rod 30 to open and close said discharge port. Reference numeral 31 designates a hopper, 32 a rotary valve and 33 a regulating valve provided in a connecting pipe for regulating the quantity of air supplied into the hopper 31 from a blower (not shown) or the atmosphere. Reference numeral 35 designates a stationary guide blade disposed within the tube 9, 36 an auxiliary inlet port connected tangentially to the cylinder 1 for feeding a powder or working gas into the cylinder 1 therethrough, the direction of said auxiliary inlet port being such that the powder or working gas injected therethrough into the cylinder will form a swirling flow in the same direction as the direction of the swirling flow of the secondary hot gas injected through the injection nozzles 16, and 37 a jacket.

The apparatus of the invention constructed as described above operates in the following manner:

First of all, the blowers 6, 15, the exhaust blower 20, the heaters 5, 14 and means for introducing heat transfer medium into the jacket 37, are actuated to maintain the cylinder at a suitable temperature. Then, a seed powder of the same composition as the final product is fed in a suitable quantity into the cylinder from the inlet port 22. The quantity of the seed powder to be charged is only required to be such that a uniform fluidized bed of the seed powder will be formed on the perforated plate 2, usually in a thickness of about 5 – 30 cm though variable depending upon the size of the cylinder, the physical properties of the particle and the design of the perforated plate. The major part of the seed powder charged into the cylinder forms the fluidized bed on the perforated plate 2 under the effect of the pressurized air (hereinafter referred to as a primary air) introduced from the blowers, and the minor part thereof is suspended in the cylinder. With reference to the primary air, the velocity of the air passing through the perforated plate 2 is preferably about 2 – 3 times the minimum air velocity (hereinafter referred to as fluidization starting velocity) necessary for the fluidization of the particles on the perforated plate 2. Excessively large velocity will result in scattering of the whole particles upwardly (such velocity will be referred to as end velocity). The fluidization starting velocity and the end velocity are variable depending upon the density, the shape, the dimension, the water content and the cohesiveness of the particles to be treated. For some products, the primary air only is insufficient to form a stable fluidized bed. In such a case, a stirring rod may be provided in the fluidized bed of particles as has been practised in conventional fluidized drying apparatus. The pressure which is required to be produced by the blower 6 is the sum of a pressure loss occurring en route to the perforated plate 2 and the pressure required for the formation of the fluidized bed of particles (hereinafter referred to as fluidized bed pressure loss) which is represented by the following formula:

$$\Delta P = PH$$

wherein: $\Delta P$ : mm column of water
$P$ : the apparent specific gravity of particle
$H$ : the height of the stationary bed of particles in terms of mm Thus, it will be understood that the power consumption decreases as the height of the fluidized bed is lowered, but excessively low height tends to induce a blow-through phenomenon. The flow rate of the primary air is regulated by the damper 4. The temperature of the primary air is so adjusted by the heater 5 as not to deteriorate the particles and will be suitable for drying. After passing through the fluidized bed, the primary air ascends in the cylinder 1, enters the separating cylinder 10 through the tube 9, moves further upward through said separating cylinder 10 and is exhausted through the outlet port 19 to the outside of the exhaust blower 20.

On the other hand, the air blown by the blower 15 (hereinafter referred to as secondary air) is heated by the heater 14 and then introduced into the secondary air chamber 12 to be injected into the separating cylinder 10 through the nozzles 16. Since the nozzles 16 extend through the wall of the separating cylinder 10 obliquely downwardly and tangentially as stated previously, the secondary air forms a swirling downward flow. As the quantity of the secondary air is progressively increased, the swirling downward flow moves into the cylinder 1 through the annular passage 11. As the quantity of the secondary air is further increased, the swirling seocndary air flow moves down to a point adjacent the surface of the fluidized bed of particles. The downward velocity of the swirling seocndary air flow is reduced by the ascending primary air and finally becomes zero. Thereafter, the secondary air moves upward, together with the primary air, in the central portion of the cylinder towards the tube 9. In this case, the secondary air still continues its swirling motion and is vigorously mixed with the primary air. Therefore, all of the particles suspended in the cylinder 1 are subjected to the effect of the centrifugal force created by the swirling air flow, and the particles of relatively large mass are urged towards the peripheral wall of the cylinder before they complete their upward movement and again move downward while being entrained in the swirling downward air flow. The air flow moving upward through the tube 9 is accelerated in its swirling motion by the spiral guide blade 35 and enters the separating cylinder 10, so that those of the fine particles having a relatively large mass in said separating cylinder 10 are urged towards the wall of said separating cylinder immediately and entrained in the swirling downward flow of the secondary air. The ultra-fine particles continue their swirling upward movement but are accelerated by the secondary swirling air flow as they move upward and urged towards the wall of the separating cylinder, and finally moved back into the cylinder 1 while being entrained in the swirling downward air flow. The quantity of the secondary air is preferably more than 30 percent of the primary air, and the velocity of the same when injected into the separating cylinder 10 through the injection nozzles 16 is about 35 m/sec or greater. It has been found that when the secondary air is injected at a velocity of about 60 m/sec, the particle separating effect is greatly enhanced and the particles of 7 microns or larger in size can be completely separated. Conventional cyclones are capable of completely separating particles of 30 – 40 microns in size.

In the apparatus of the invention, as described aobve, a fluidized bed of particles is formed at the bottom of the cylinder continuously, while in the cylinder 1 and the separating cylinder 10, the particles are continuously suspended and separated by the effects of the swirling downward and upward air flows. Under such condition, the pump 25 is operated to feed a stock solution to the spray nozzle 23 from the stock solution tank 24 through the conduit 26, and sprayed in the cylinder 1. The fine particles of the stock solution sprayed are immediately dried by the surrounding hot air but most of them exhibit different behaviours in the cylinder before they are completely dried. Namely, some solution particles adhere to the ascending seed powder particles and move upward or downward therewith. Some other solution particles collide against the swirling downward powder particles and bond therewith, or, on rare occasions, reach and adhere the wall of the cylinder directly. However, the undried solution particles attached to the cylinder wall are successively scraped by the swirling downward flow of powder particles and do not accumulate thereon. Still some other solution particles fall in the undried state into the fluidized bed of the powder particles but are dried substantially concurrently by said fluidized bed which is thick and large in heat capacity, without attaching to the perforated plate 2. As will be understood from the foregoing description, the process of drying the solution droplets into solid particles in the method of this invention is completely different from that in conventional spray drying methods. In the conventional methods, the chance of each droplet of a sprayed solution bonding with the other droplet before it reaches a discharge port of an apparatus is very slim, and each droplet is dried from the surface thereof while remaining in its spherical shape by the effect of surface tension, and a shell is formed. The water remaining interior of the shell is evaporated last. Therefore, the product powders are hollow and small in bulk density, and, therefore, susceptible to breakage. According to the instant invention, the droplets of the sprayed solution are attached to and dried on the dry powder particle one on another, so that the product particle is not spherical but porous in shape and large in bulk density.

In the method of this invention, since the undried solution droplets are not attached directly to the side wall or the bottom of the cylinder and grown thereon as stated above, the apparatus for practising the method can be very small in size as compared with the conventional spray drying apparatus. According to the conventional methods, for instance, an apparatus having a diameter of about 3000 mm and a height of about 5000 mm is required for the treatment of a ceramic solution at the rate of 100 kg/hr, whereas according to the instant invention an apparatus of as small as 800 mm in diameter and 2000 mm in height is sufficient for treating the same solution at the same rate, i.e. the apparatus cost can be reduced to about one third of the former.

Further, because of the small size, the apparatus according to the invention can be easily constructed in double wall structure, and in this case a highly effective heat transfer can be achieved between the powder particles entrained in the swirling air flows and the cylinder wall, by circulating a high temperature heating medium through between the inner and outer walls. Consequently, the thermal efficiency can be enhanced and the drying effect can be improved, and in addition, the condensation of aqueous vapour on the cylinder wall can be prevented, which would otherwise occur as a result of the aqueous vapour being cooled from the outside of the cylinder wall, and, therefore, the attachment of the powder particles to the cylinder wall or the growth of the same on the cylinder wall can be completely avoided. On some occasions, it is preferable to circulate a low temperature heating medium through the double walls, depending upon the properties of the desired product. The formation of the fluidized bed of powder particles has further positive advantages as set forth below, in addition to those set forth above. Namely, one of them is that the provision of a secondary dryer becomes unnecessary as the residence time of each powder particle within the cylinder can be substantially prolonged and the drying up to a low water content region becomes possible which has been impossible heretofore. Another one is that the particle size of the product particles can be uniformalized by the formation of a single fluidized bed.

As stated previously, the wind velocity which causes the scattering of particles in the fluidized bed, that is, the end velocity, is influenced by the density and size of the powder particles. This means that, when powder particles of different sizes are fed into the fluidized bed, those of relatively small density and size are readily scattered upwardly and those of relatively large density and size are fluidized in the bottom of the cylinder. Therefore, when the product particles are withdrawn from the bottom of the cylinder, the particles of large size can selectively be obtained, i.e. the particles of uniform size and quality can be obtained, and further the flowability of the particle can be improved.

Still another advantage is that, since the fine powder particles are constantly circulating within the cylinder in a suspended state, to which the droplets of a sprayed stock solution adhere, a solution such as a sugar stock solution, from which the product powder can hardly be obtained merely by drying, can be easily converted into powder. Conventional spray drying methods for sugar stock solutions include those disclosed in Japanese Patent Publications No. 7810/66 and No. 20384/69. In the method of the instant invention, however, while it may be necessary to continuously feed a seed powder into the apparatus depending upon the properties of a stock solution to be processed and the properties of the desired granule, in most cases the seed powder is required to be fed only at the start of the operation. Furthermore, the method of the invention has such advantages over the prior art methods that the apparatus used is simple in construction and the construction cost can be as low as about one fifth of that of the apparatus used in the prior art methods, that the operation is very easy and that the production cost can be reduced.

In practising the method of this invention, a screw feeder or the like may be provided at the bottom of the apparatus for withdrawing the product powder, but in this case, means for detecting the level of the fluidized bed must be provided to withdraw the product while maintaining the height of the fluidized bed at a substantially constant level. In a more effective method of discharging the product powder, the interior of the cylinder is maintained at a subatmospheric pressure (in this type of apparatus, a negative pressure generally appears in the cylinder 1 during operation) and the valve 29 and the air regulating valve 33 are opened, whereupon the atmospheric air flows into the cylinder through the valve 33, the connecting pipe 34, the discharge conduit 28 and the gap between the wall of the discharge port 27 and said valve 29. The flow rate of the air introduced into the cylinder is determined by the resistance of the above-described passage and the pressure at the discharge port. When the seed powder is placed on the perforated plate 2 under such condition, the negative pressure at the discharge port becomes small and the flow rate of the air flowing into the cylinder is lowered, due to the increasing quantity of the product particles and the pressure loss of the fluidized particle bed. When the quantity of the product particles is small and the flow rate of the air introduced into the cylinder is high, the product particles are blown up by the air and not discharged, but when the quantity of the product particles increases and the flow rate of the air is decreased to a certain level, the product particles are suddenly discharged. The product particles thus discharged are only those whose particle size is large enough to fall down by gravity against the blow-up force of air introduced into the cylinder. Those particles which are smaller in size than the aforesaid particles are selectively blown up by the air and not discharged.

With the arrangement described above, the flow rate of the air blowing into the cylinder is automatically increased as the quantity of the particles on the perforated plate 2 decreases, and hence the product particles are not discharged. On the other hand, when the quantity of the particles increases, the flow rate of the air is automatically decreased by reason of pressure balance, and the product particles are discharged. Thus, it is unnecessary to provide a special level controlling means and the operation is very simple. If necessary, a blower may be provided to blow air into the discharge port 27 at a predetermined rate.

The selection of the particle size of the product particles is possible by controlling the flow rate of the air introduced into the cylinder as described above. The repeated experiments conducted with a prototype apparatus have revealed that, if the damper 21 and the air regulator 33 are previously adjusted, the level of the fluidized bed cna always be maintained constant, without fluctuation of the internal pressure of the cylinder and the product particles can be discharged constantly in the normal state, and thus a very uniform product can be obtained.

A practical example of the method of obtaining a product granular particle from a sugar stock solution, using the apparatus described above, will be illustrated hereunder: First of all, 10 kgs of 100 mesh castor sugar is charged in the empty drying chamber and then hot air heated at 90°C is introduced at the rate of 5 m³/min through air chamber 3 and hot air heated at 100°C is introduced as the secondary air at the rate of 8 m³/min through air chamber 12, into the drying chamber by operating the blower 15 which has previously been adjusted. Therefore, the blowers 15 and 6 obviously deliver air at the rate of 13 m³/min, but the drying chamber is maintained at a suitable negative pressure. Lukewarm water at 85°C is circulated in the jacket. The castor sugar charged moves actively in a fluidized state in the bottom of the drying chamber, with part thereof makes a circulatory upward and downward swirling movement. A stock sugar solution, composed of 39.5 percent of water and 60.5 percent of solid sugar, is heated to 75°C and fed into the drying chamber at the rate of 20 kg/hr by means of the pump 25. A castol sugar is formed about 10 minutes after the stock sugar solution is sprayed. The castol sugar thus formed is discharged from the drying chamber by opening the valve 29 and the air regulating valve 33 to a suitable degree of opening. Thus, a product granular sugar can be obtained continuously. The rate of discharge of the product particles during a short period after the discharge valve is opened, is not equal to the value calculated from the proportion of the solid in the stock solution supplied, but is naturally stabilized at said value in about 5 minutes, and the level of the fluidized bed of castol sugar in the bottom of the drying chamber is also maintained constant. The size of the product particles also becomes uniform, once the apparatus has reached the normal operating condition. The measured particle sizes of the product particles discharged in the normal operation of the apapratus are shown in the table below:

| Mesh (D) | >16 | 16–20 | 20–50 | 50–60 | 60–80 | 80> |
|---|---|---|---|---|---|---|
| Percentage | 1.8 | 1.2 | 87 | 4 | 4 | 2 |

The method and apparatus of the instant invention can also very effectively used in obtaining a granular powder product by adding a liquid to a powdery substance and acting a reactive gas, such as $Cl_2$, $CO_2$ or $SO_2$, on the powdery substance-containing liquid. In such a case, the powdery substance or the gaseous reactive substance is continuously fed into the cylinder and caused to make a circulatory upward and downward swirling motion of the type described above, while a reactive gas is blow into the cylinder through the perforated plate, the nozzle or the auxiliary inlet port to finely atomize liquid in the cylinder. The liquid, the powdery substance and the reactive gas are sufficiently contacted and chemically reacted with each other, whereby granular powdery particles can be obtained.

According to the instant invention, as described above, fine particles are suspended in the drying cylinder by gas blown into said drying cylinder from the bottom thereof, while liquid of the same material as said particles is continuously sprayed in the same drying cylinder, the droplets of said sprayed liquid forming granular particles using said fine particles as nuclei, said granular particles being retained in the bottom of said drying cylinder in fluidized state under the action of said gas, whereby the particles relatively weakly bonded are partially destroyed into fine particles which replenish the consumed fine nuclear particles in the drying cylinder, and those of said granular particles which have grown to a certain desired size being discharged from the drying cylinder.

The formation of the swirling upward and downward flow of gas in the drying cylinder is not always necessary where the material to be processed is easy to handle and less adhesive, but is essential for making the apparatus compact and minimizing the quantity of the fine particles escaping from the apparatus while being entrained in the exhaust gas. It is also very important that a fluidized bed of particle is formed in the bottom of the drying cylinder. On some occasions, however, the height of the drying cylinder may be increased sufficiently to ensure that the droplets of the sprayed solution are completely dried before they reach the bottom of the cylinder and the fine nuclear particles are fed in a sufficient quantity into the cylinder through an additional inlet port. The solution may be sprayed horizontally or obliquely from the wall of the drying cylinder towards the center thereof, or may be sprayed upwardly from a point adjacent the fluidized bed at the bottom of the drying cylinder. In short, the solution may be sprayed in any manner, provided that the operation of the apparatus will not be adversely affected or the yield of the product particles will not be lowered by the droplets of the solution attaching to the peripheral wall or the bottom of the cylinder and growing thereon. It is also to be understood that the powderization of a liquid material may be attained by cooling and solidifying the droplets of said liquid by blowing cold gas into the drying cylinder, instead of the hot gas used in the example illustrated herein.

Although the present invention has been described and illustrated herein in terms of a specific embodiment thereof, it should be understood that the invention is not restricted to the details of the embodiment shown but many changes and modifications are possible. For instance, the cylinder 1 is preferably of circular cross-section but may be of a polygonal cross-section. Further, the method of the invention is applicable, not only to sugar and ceramics, but also to paraffin and other compounds.

We claim:

1. A spray drying method comprising forming a layer of solid particles at the bottom of a drying chamber defined by a vertical cylinder, blowing gas into said layer from the underside to agitate the whole of said layer and thereby to form a fluidized bed of solid particles with part of said particles being blown up from the upper surface of said fluidized bed and suspended within said drying chamber, blowing gas into said drying chamber in a direction to form a swirling downward gas flow along the side wall and a swirling upward flow along the center of said drying chamber, whereby said suspending particles are caused to make a circulatory motion while being entrained in said swirling gas flows in such a manner that the fine particles spirally move upward in the center of the drying chamber and at least the major part thereof approach the side wall of the drying chamber under the effect of centrifugal force before they reach the top of said drying chamber and finally spirally move downward along the side wall of said chamber, said particles being partially returned to said fluidized bed and partially being carried upward again in the center of the drying chamber by being entrained in said swirling upward gas flow, spraying stock solution into said drying chamber, the droplets of said sprayed stock solution colliding against and adhered to said circulating particles to form larger sized particles, said larger sized particles being dried by the surrounding gas and partially circulated within said drying chamber and partially falling into said fluidized bed, and discharging said larger sized particles from said fluidized bed while maintaining the depth of said fluidized bed substantially constant.

2. A spray drying method according to claim 1, wherein said gas is introduced into said drying chamber from product particle discharge port means provided at the bottom of said drying chamber and those of said larger sized particles which have grown to a predetermined size and larger are discharged under gravity through said discharge port means against the flow of said gas, whereby the particles of the predetermined size are selectively obtained.

3. A spray drying method according to claim 1, wherein said drying chamber has a double wall structure and a heat transfer medium is circulated through the interspace between the inner wall and outer wall.

4. A method in accordance with claim 1 in which the gas is introduced into the drying chamber in the direction substantially tangential to the side wall of said chamber.

5. A method in accordance with claim 1 in which said swirling upward flow along the center of said drying chamber is passed through separating means to centrifugally separate the particles suspended therein.

6. A spray drying apparatus comprising a vertical cylinder defining a drying chamber, gas inlet port means provided at the upper portion of said drying chamber to form swirling downward gas flow, gas outlet port means provided at the center of the upper end of said drying chamber for exhausting an ascending gas flow therethrough, perforated plate means disposed at the bottom of said drying chamber, means for blowing air into said drying chamber from the underside through said perforated plate, means for spraying stock solution into said drying chamber, and means for discharging solid particles from a solid particle layer formed on said perforated plate means.

7. A spray drying apparatus according to claim 6, wherein said discharge means includes at least one product discharge conduit extending upwardly towards the bottom of said drying chamber with the upper end opening at said perforated plate, and is provided with means for regulating gas flow being introduced into the drying chamber through said discharge conduit.

8. A spray drying apparatus according to claim 6, wherein means is provided at the top portion of said drying chamber for separating the solid particles by the effect of centrifugal force from the gas flowing upwardly from said drying chamber and part of swirling gas flow within said separating means is led into the drying chamber to form swirling downward gas flow.

* * * * *